United States Patent [19]
Fialla

[11] Patent Number: 5,149,769
[45] Date of Patent: Sep. 22, 1992

[54] PROCESS FOR THE PRODUCTION OF AROMATIC POLYESTERS

[75] Inventor: Peter Fialla, Maria Enzersdorf, Austria

[73] Assignee: Isovolta Osterreichische Isolierstoffwerke, Wierner Neudorf, Austria

[21] Appl. No.: 806,694

[22] Filed: Dec. 12, 1991

Related U.S. Application Data

[63] Continuation of Ser. No. 574,605, Aug. 28, 1990, abandoned, which is a continuation of Ser. No. 224,917, Jun. 16, 1988, Pat. No. 4,962,180.

[30] Foreign Application Priority Data

Oct. 2, 1986 [AU] Australia .............................. 2796/86

[51] Int. Cl.$^5$ ........................ C08G 63/02; C08G 63/18
[52] U.S. Cl. .................................... 528/193; 528/176; 528/194
[58] Field of Search ........................ 528/176, 193, 194

[56] References Cited

U.S. PATENT DOCUMENTS 3,216,970 11/1965 Conix et al. ......................... 528/193
4,401,803 8/1983 Rieder .................................. 528/176

Primary Examiner—John Kight, III
Assistant Examiner—T. Mosley
Attorney, Agent, or Firm—Bierman and Muserlian

[57] ABSTRACT

In a continuous process for the manufacture of aromatic polyesters by polycondensation of mono- or multinuclear substituted or unsubstituted diphenols, with halides of aromatic dicarboxylic acids according to the two-phase interface polycondensation process, the first step is to produce continuously a fine pre-emulsion with an organic solvent and from the aqueous phase, consisting of a solution obtained from the diphenols, of an alkaline hydroxide in order to form the diphenates and possibly of a phase transfer catalyst in water or in a mixture of water and of an organic solubilizer. This pre-emulsion is fed in quantities to a dispersion unit jointly with the organo-liquid phase forming the acid chloride solution. The compounds involved in the polycondensation reaction are mixed in the dispesion unit in constant proportions in order to produce a reaction emulsion which then passes successively through one or several dispersion units and/or into static mixers, the polycondensation taking place and being completed during this period. The phases are then separated and the polyester formed is precipitated from the organic phase.

9 Claims, 1 Drawing Sheet

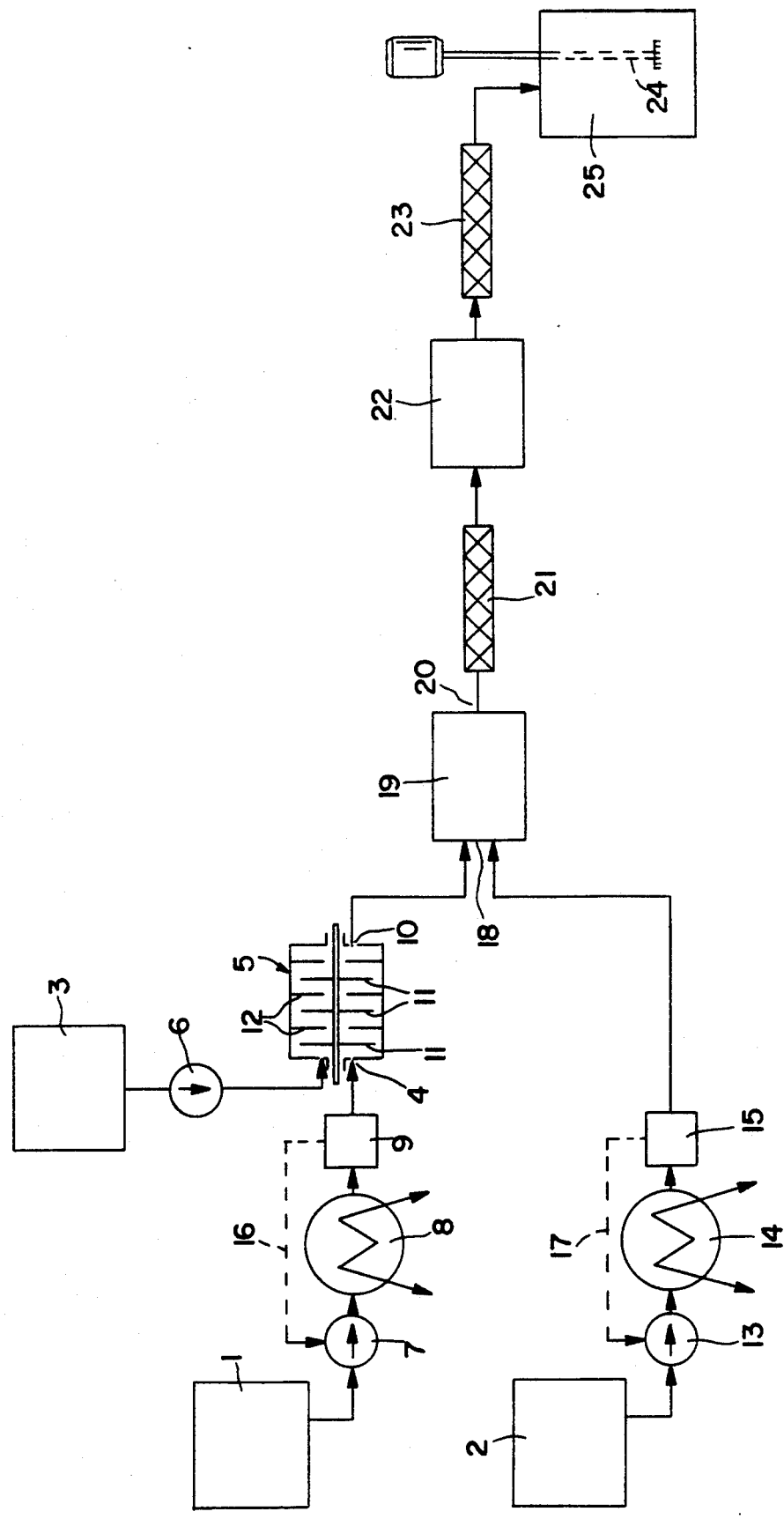

PROCESS FOR THE PRODUCTION OF AROMATIC POLYESTERS

PRIOR APPLICATION

This application is a continuation of U.S. patent application Ser. No. 574,605 filed Aug. 28, 1990, now abandoned, which is a continuation of U.S. patent application Ser. No. 224,917 filed Jun. 16, 1988, now U.S. Pat. No. 4,962,180.

The invention relates to a process for the production of aromatic polyesters through polycondesation of mono- or multi-nuclear substituted or unsubstituted diphenols with halides of aromatic dicarboxylic acid according to the two-phase interface polycondensation process, where from the aqueous phase, consisting of a solution of the diphenols, alkaline hydroxide for the formation of the diphenolates and possibly a phase transfer catalyst in water or in a mixture of water and an organic solubilizer with the organo-liquid phase consisting of a solution of an acidic halide in an organic solvent, a fine reaction emulsion is produced, with the diphenolates having been converted to the organo-liquid phase entering into polycondensation reactions with the acid halides.

Processes of the above mentioned kind have been known for a long time, for example, also from U.S. Pat. No. 3,216,970. The polycondensation process here is carried out as batch process, where the aqueous and the organo-liquid phase are mixed in a reaction vessel while being vigorously stirred and the polyester forming in the polycondensation following the separation of the phases is finally precipitated from the organo-liquid phase.

The polyesters produced according to such batch process, however, frequently have a molecular weight distribution with a relatively high oligomer component, which in many cases negatively effects, for example, the material properties of films produced from such polyesters. In addition, when greater batches are used in these processes the difficulty is encountered of stirring the emulsion sufficiently, the viscosity of which increases rapidly with progressing polymer formation as well as—due to the exothermicity of the process—to maintain the emulsion at the desire low reaction temperature through high cooling expenditures. In addition, the results of such batch processes cannot readily be reproduced. The invention is based on the task of indicating a process of the initially mentioned kind, which permits the production of aromatic polyesters in large quantities in a readily reproducible manner, which polyesters have only a small fraction of oligomers.

The task, on which the invention is based, is solved in the process according to the invention, which is characterized in that for a continuous process a fine pre-emulsion is prepared from the aqueous phase and an organic solvent, that the pre-emulsion and the organo-liquid phase are fed into the input of a dispersing unit in quantities, that the compounds participating in the polycondensation reaction are mixed at constant proportions in the dispersing unit for the formation of the reaction emulsion, and that the reaction emulsion, subsequently, passes sequentially through one or several dispersing units and/or static mixers. Advantageously, the aqueous phase is the lesser component by volume in the volume of the reaction emulsion and possibly also the pre-emulsion, so that the organo-liquid phase respectively the organic solvent forms the continuous phase of the particular emulsion.

The used bi-nuclear diphenols are preferrentially compounds having the formula

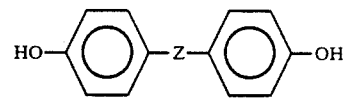

in which Z is a single bond,

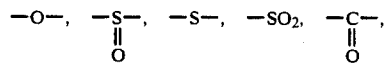

a bi-functional aliphatic hydrocarbon residue or a bi-functional hydrocarbon residue containing at least one aromatic or cycloaliphatic ring, as well as alkylated or halogenated derivatives of such compounds.

The process according to the invention covers also the use of mixtures of different diphenolates as well as mixtures of different acid chlorides.

According to an advantageous form of the invention, the reaction emulsion initially passes through one or several static mixers, subsequently through a dispersing unit, and, subsequently, again through one or several static mixers.

According to a further advantageous form of the invention, the process according to the invention is characterized in that dispersing units are used, which each has a rotor rotating at a circumferential speed of at least 5 m/s, preferentially, however, at least 10 m/s, provided with several recesses or perforations and which, in each instance, is separated by a small mixing chamber from an associated stator, possibly likewise provided with recesses or perforations.

Below, the process according to the invention is explained in greater detail in conjunction with an example.

To prepare the aqueous phase, first 92 g (2.3 Mol) NaOH and subsequently 350 g (1 Mol) 9,9-bis(4-hydroxyphenyl)-fluorene are dissolved in 3 l demineralized water and 1.5 l dioxan under the addition of heat. To this solution 23 g (0.1 Mol) benzyltriethylammoniumchloride dissolved in 100 ml demineralized water are added as phase transfer catalyst.

The organo-liquid phase consists of a solution of 101.6 g (0.5005 Mol) iso-phthaloylchloride and 101.6 g (0.5005 Mol) terephthaloylchloride in 1 l waterfree (absolute) 1,2-dichloroethane.

The drawing is a schematic representation of the arrangement used in the present process example.

The aqueous phase and organo-liquid phase are each cooled to approximately 17° C. and placed in container 1 respectively 2. 1,2-dichloroethane (DCE) is filled into container 3 in a quantity of 6 l. In the course of the process for the production of a pre-emulsion into the input 4 of a first dispersing unit 5 are fed: from container 3 through pump 6 the DCE in the amount of 0.2 l/min and from container 1 through pump 7, a heat exchanger 8, and a flow meter 9 the aqueous phase in an amount of 0.16 l/min. From the DCE and the aqueous phase in the passage through the dispersing unit 5 a fine pre-emulsion is continuously produced with the DCE as continuous phase, which is removed at output 10 of dispersing unit 5.

The dispersing unit 5 is of type rotor-stator, which contains, for example, three series-connected mixing stages, in which each mixing stage has a rotor 11 provided with, for example, slit-shaped perforations, which—in the direction of flow—follows a small mixing chamber and a stator 12 also provided with perforations. The circumferential speed of the rotors 11 located on a common driving shaft is approximately 17 m/s.

Concurrently with the continuous production of the pre-emulsion, from container 2 through pump 13, a heat exchanger 14 and a flow meter 15 the organo-liquid phase consisting of the acid chlorid solution is fed in an amount of 0.04 l/min continuously and together with the pre-emulsion to the input 18 of a second dispersing unit 19, which is structured similar to the first dispersing unit 19, in which the acid chloride solution is mixed with the DCE of the pre-emulsion and the degree of fineness of the emulsion maintained respectively further increased. In the dispersing unit 19 the polycondensation starts suddenly, with the forming polymers staying in solution in the organo-liquid phase.

For the process to function perfectly it is important that the diphenolate dissolved in the aqueous phase and the acid chloride supplied in the organo-liquid phase always enter into the reaction in precisely defined constant proportions. For that purpose, the two phases with the aid of the two heat exchangers 8 respectively 14 are maintained at a temperature of, for example, 17° C. and at this temperature supplied to the through-flow meters 9 and 15, which control—by way of the control circuits indicated by 16 and 17 —the delivery of pump 7 respectively 13 in view of constant through-flow quantities.

The reaction emulsion removed from output 20 of the dispersing unit 19 present in the form of a fine emulsion with homogeneous organo-liquid phase is transported through a first static mixer 21, subsequently through a further dispersing unit 22 of the same kind as the two first dispersing units 5 respectively 19, and, lastly through a second static mixer 23, whereupon the polycondensation reaction is completed. The length of time the reaction emulsion stays in the reaction zone, i.e. from input 18 of the dispersing unit 19 to the output of the second static mixer 23 is approximately 4 minutes in the present example.

The emulsion, in which the formed polyester is dissolved in the organo-liquid phase, is then introduced into a vessel 25 provided with a stirrer 24, into which approximately 10 l of demineralized water had been placed. After the solutions prepared in containers 1 and 2 has been used up and after completion of the polycondensation process, the two phases are separated by decanting and the alkaline aqueous phase discarded. The remaining solution of polyester in DCE is subsequently washed chloride-free and the polyester is precipitated following introduction of acetone, centrifuged, and dried at 130° C. The inherent viscosity measured at 30° C. in a solution of 0.5 g polyester in 100 ml solvent consisting of 60 percent by weight phenol and of 40 percent by weight 1,1,2,2-tetrachloroethane was 1.62 dl/g.

With the process according to the invention polyesters can be produced, which have primarily acid end groups or phenolic end groups depending on whether the acid chloride respectively the diphenolate are used in slight excess. Due to the hydrolysis of the acid chloride which competes with the polycondensation, which reduces the quantity of acid chloride available for the polycondensation reaction, to achieve a stoichiometric ratio of the used reagents decisive for the polycondensation reaction, at which—based on experience—a maximum of the inherent viscosity is obtained, preferentially a slight acid chloride excess is used (1.001 Mol acid chloride relative to 1 Mol diphenolate in the present example).

I claim:

1. A continuous process for producing an aromatic polyester by polycondensing at least one mono- or multinuclear substituted or unsubstituted diphenol as first reactant with at least one aromatic dicarboxylic acid halide as second reactant comprising:
   preparing an aqueous phase by mixing the said at least one diphenol, an alkali metal hydroxide for the formation of diphenolates with a phase transfer catalyst, water or a mixture of water and an organic solubilizer;
   preparing an organic liquid phase by mixing the said at least one aromatic dicarboxylic acid halide and an organic solvent to form a solution thereof;
   continuously mixing the aqueous phase with an organic solvent to form a fine pre-emulsion;
   preparing a reaction emulsion by continuously supplying organic liquid phase and pre-emulsion to an input of a dispersing unit whereby reactants in said phase and pre-emulsion are mixed in constant proportions;
   passing the reaction emulsion through at least one dispersing unit.

2. The process of claim 1 comprising passing the reaction emulsion in addition to its passing through dispersing units, through a static mixer or through several static mixers.

3. The process of claim 2 wherein the reaction emulsion passes first through at least one static mixer subsequently through a dispersing unit and subsequently again through at least one static mixer.

4. The process of claim 1 wherein in the reaction emulsion, the volume of the aqueous phase is smaller than the volume of the other phase of the reaction emulsion.

5. The process of claim 4 comprising passing the reaction emulsion in addition to its passing through dispersing units, through a static mixer or through several static mixers.

6. The process of claim 4 wherein in the fine pre-emulsion, the volume of the aqueous phase is smaller than the volume of the organic solvent.

7. The process of claim 1 wherein the dispersing units have a rotor rotating at a circumferential speed of at least 5 meters per second which is provided with several recesses or perforations, and which, in each instance, is separated by a small mixing chamber from an associated stator also provided with recesses or perforations.

8. The process of claim 6 wherein said dispersing units have a rotor rotating at a circumferential speed of at least 10 meters per second.

9. A continuous process for producing an aromatic polyester by polycondensing at least one mono- or multinuclear substituted or unsubstituted diphenol as first reactant with at least one aromatic dicarboxylic acid halide as second reactant comprising:
   preparing an aqueous phase by mixing the said at least one diphenol, an alkali metal hydroxide for the formation of diphenolates with or without a phase transfer catalyst, water or a mixture of water and an organic solubilizer;

preparing an organic liquid phase by mixing the said at least one aromatic dicarboxylic acid halide and an organic solvent to form a solution thereof;

continuously mixing the aqueous phase with an organic solvent to form a fine pre-emulsion;

preparing a reaction emulsion by continuously supplying organic liquid phase and pre-emulsion to an input of a dispersing unit whereby reactants in said phase and pre-emulsion are mixed in constant proportions;

passing and reacting the reaction emulsion through at least one dispersing unit;

having the polyester polycondensed, which thereby is formed in solution in the organic liquid phase;

separating the organic liquid phase from the aqueous phase; washing the organic liquid phase;

introducing acetone into it for precipitation of the polyester out of the organic liquid phase.

* * * * *